June 26, 1934.  H. L. TANNER  1,964,229
TELEMETRIC TRANSMISSION
Original Filed April 26, 1926
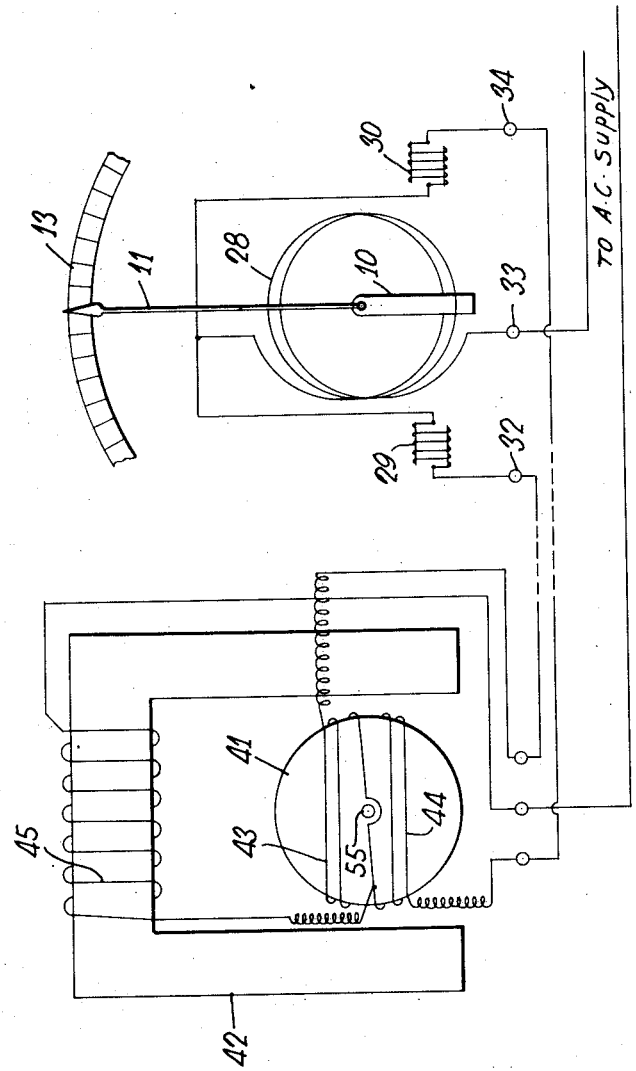
Inventor
Harry L. Tanner
By his Attorneys
Cooper, Kerr & Dunham Patented June 26, 1934

1,964,229

UNITED STATES PATENT OFFICE 1,964,229

TELEMETRIC TRANSMISSION

Harry L. Tanner, Brooklyn, N. Y., assignor, by mesne assignments, to Wallace & Tiernan Products, Inc., Belleville, N. J., a corporation of New Jersey Original application April 26, 1926, Serial No. 104,662. Divided and this application May 7, 1929, Serial No. 361,041

8 Claims. (Cl. 177—351)

This invention relates to means for transmitting intelligence at a distance. More specifically it relates to telemetric systems.

Among other purposes the invention has for some of its objects to provide a novel system for transmitting intelligence at a distance and to provide a novel form of transmitting instrument. Other objects and advantages will appear as the invention is hereinafter disclosed.

The drawing is a diagrammatic view illustrating my transmitting instrument electrically connected to an indication-producing instrument.

The indication-producing instrument (10, 11, 13, 28, 29, 30, 32, 33, 34) is shown in greater detail in Figs. 1 and 2 of my copending application, Serial No. 675,428, filed November 17, 1923, (now Patent No. 1,841,341) in which application it is described in greater detail and claimed; and was also shown in Figs. 1 and 2 of my copending application, Serial No. 104,662, filed April 26, 1926, (now Patent No. 1,741,590) where also it is described in greater detail. In the present application, only such disclosure of the indication-producing instrument is made as will enable those skilled in the art to understand how to make and use the transmitter and system. If more detailed information as to the indication-producing instrument is desired or required it will be found in my said copending application, Serial No. 675,-428, (now Patent No. 1,841,341) or my said copending application, Serial No. 104,662 (now Patent No. 1,741,590). The present application is a division of my said copending application, Serial No. 104,662, which, as stated was filed on April 26, 1926 (now Patent No. 1,741,590).

I shall now proceed to describe the form of transmitting instrument and electrical connections shown diagrammatically in the drawing. The transmitting instrument comprises a rotor or movable element 41 and a stator 42. The rotor is shown as a cylinder mounted upon a suitably journaled shaft 55 for rotation or oscillation about its axis. The shaft 55 to which the rotor or movable element 41 is secured may be actuated by a float mechanism (not shown in the present application but fully illustrated and described in my said copending application, Serial No. 675,-428 (now Patent No. 1,841,341)) whereby the indication-producing instruments 11—13 etc. may be caused to indicate level of liquid at a distance, or the shaft 55 may be actuated by other mechanisms and for other purposes. Mounted upon the rotor or movable element 41 are two coils or windings 43, 44, connected at one end to a corresponding one of the terminals 32, 34 of the coils 29, 30. The other ends of the coils or windings 43, 44 are shown connected to each other and to one terminal of a coil or winding 45 mounted on the laminated iron or steel core of the stator 42. The other end of the stator coil or winding 45 is shown connected to one side of a line supplied with alternating current. The other side of the alternating current supply is shown connected to the one terminal of the stationary coil 28 of the indicating instrument (which magnetizes the iron vane 10 of the indicating instrument), the other terminal of which is shown connected to the terminals of the coils 29, 30 opposite to those to which the coils 43, 44 are connected. It will be understood that the transmitting instrument, shown in the left hand part of the drawing, may be placed at any desired distance from, or position with respect to, the indicating instrument shown in the right hand part of the drawing. It should be understood further that the transmitting instrument is shown diagrammatically but sufficiently for those skilled in the art to understand how to make and use it, in view of the foregoing and following description. Thus, the curls of wire shown directly at the terminals of the coils 43, 44 will be recognized as flexible leads and not coils or inductances. Preferably the drum of the rotor or movable element 41 is constructed of magnetizable material such as iron or silicon steel laminations.

The connections of the coils 28, 29, 30 are such that the polarity of the inner ends of the coils 29 and 30 is the same as the front end of the coil 28. Thus if the polarity of that end of the pivotally mounted magnetizable element or vane 10 which lies between the coils 29 and 30 is north (or south) at any instant of time by the virtue of its magnetization by the coil 28, the polarity of the inner ends of the coils 29 and 30 will be north (or south) at that time. In other words, the coils 29 and 30 each repel the element 10 and these forces of repulsion act in opposite directions. It will be remembered that the position of equilibrium of the element 10 depends upon the relative magnitude of the ampere-turns in the coils 29 and 30. If the turns and electrical constants of the coil 29 are the same as those of coil 30—the coils 29, 30 are preferably so constructed—then the position of equilibrium of the element 10 will depend upon the relative strength of currents in the said two coils 29 and 30.

In the transmitter the design is preferably such that the number of turns and constants of the coil 43 is the same as those of the coil 44. It will be noted that each of the coils 43, 44 is conductively and inductively coupled to the coil 45. When, as shown in the drawing, the axis of the coils 43, 44 is at right angles to the magnetic flux passing from one of the poles of the stator 42 to the other, the current flowing through the coils 43, 44 is solely current of conduction. The current through the coils 29—43 is then equal to that through the coils 30—44 and the pointer 11 occupies its mid-position. However, when the rotor 41 moves from the position shown, the coils 43 and 44 are cut by the stator flux and electromotive forces are induced in each of these coils. The connections are such that when the rotor 41 is moved in one direction from the position shown the induced electromotive force aids the flow of current through the coil 43 and the induced electromotive force opposes the flow of current through the coil 44, and when the rotor is moved in the opposite direction from the position shown the induced electromotive force opposes the flow of current through the coil 43 and the induced electromotive force aids the flow of current through the coil 44. It will be appreciated that the magnitude of the induced electromotive forces will depend upon the extent of deflection of the rotor 41 from the mid position shown. In other words, when the rotor or movable element 41 moves in one direction from the mid-position the current through the coil 29 exceeds that through the coil 30 by an amount dependant upon the extent of deflection of the element 41 from mid position; and when the element 41 moves in the opposite direction from the mid position the current through the coil 30 exceeds that through the coil 29 by an amount dependant upon the extent of deflection of the element 41 from mid position. The scale 13 may therefore be calibrated to indicate, in cooperation with the pointer 11, angular positions of the remotely located rotor or movable element 41 or any device connected thereto.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted without interfering with the more general results outlined, and the invention extends to such use.

What I claim is:—

1. An alternating current transmitting instrument comprising in combination, a stator element, a rotor element, a winding on one of said elements and a pair of windings on the other of said elements, the inductive coupling between the winding on one of said elements and the windings on the other of said elements being variable through zero, and conductive connections for causing alternating current to flow through said windings when said inductive coupling is zero and for causing the flow of current through one of said pair of windings to differ from the flow of current through the other of said pair of windings when said inductive coupling is finite.

2. An alternating current transmitting instrument for controlling an indicator at a distance and comprising in combination, a stator element, a rotor element, a winding on said stator element, a winding on said rotor element variably inductively coupled to said first mentioned winding, an intermediate tap on one of said windings, and an electrical connection between said tap and an end of the other of said windings.

3. An alternating current transmitting instrument comprising in combination, a stator element, a rotor element, a winding on one of said elements, a pair of windings on the other of said elements variably inductively coupled to said first mentioned winding, and electrical connections for causing current to flow through said first mentioned winding and to divide between said pair of windings, said electrical connections including a connection of electromagnetically opposite ends of said pair of windings whereby current induced in the latter by the first winding flows serially through said pair of windings in the same direction.

4. An alternating current transmitting instrument for controlling an indicator at a distance and comprising in combination, an iron-cored transformer having a plurality of windings at least one of which is rotatable to vary through zero its coupling with respect to two other of said windings, and means supplying current to all of said windings when said coupling is zero, said means including electrical connections of said two other variably coupled windings providing them in series with like magnetic axes in respect to said first mentioned variably coupled winding, whereby flow of current in one of said two other windings will differ from flow of current in the other of same when said coupling is finite.

5. An alternating current transmitting instrument comprising in combination, a stator winding, and a pair of rotor windings connected in parallel with respect to each other and in series with said stator winding, whereby the flow of current in one of said pair of windings is caused to differ from the flow of current in the other of said pair of windings in accordance with the position of the rotor.

6. An alternating current transmitting instrument comprising in combination, a stator element, a rotor element, a winding on one of said elements, and a pair of windings on the other of said elements connected in parallel with respect to each other and in series with said first mentioned winding, whereby the flow of current in one of said pair of windings is caused to differ from the flow of current in the other of said pair of windings in accordance with the position of the rotor.

7. An alternating current transmitting instrument for controlling an indicator at a distance and comprising in combination, an iron-cored transformer having a plurality of windings at least one of which is rotatable to vary through zero its coupling with respect to another of said windings, an intermediate tap on one of said variably coupled windings, and an electrical connection between said tap and an end of the other of said variably coupled windings.

8. An alternating current transmitting instrument for controlling an indicator at a distance from a source of supply current and comprising in combination, a stator element, a rotor element, a winding on one of said elements, and means which include a winding on another of said elements variably inductively coupled to said first mentioned winding with all turns of said second-mentioned winding in the same direction relative to the first mentioned winding and which also include electrical connections from the first-mentioned winding to a point of electrical connection intermediate the ends of the second mentioned winding, for causing a potential difference due to supply current between each outside end of the second-mentioned winding and the first mentioned winding, and a potential difference due to induced current between the outside ends of the second-mentioned winding themselves.

HARRY L. TANNER.